United States Patent
Cai

(10) Patent No.: US 7,857,329 B2
(45) Date of Patent: Dec. 28, 2010

(54) SERVICE CART

(75) Inventor: You-Hua Cai, Shenzhen (CN)

(73) Assignees: Hong Fu Jin Precision (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 306 days.

(21) Appl. No.: 12/133,395

(22) Filed: Jun. 5, 2008

(65) Prior Publication Data
US 2009/0166991 A1 Jul. 2, 2009

(30) Foreign Application Priority Data
Dec. 29, 2007 (CN) .................. 2007 1 0203582

(51) Int. Cl.
B62B 3/00 (2006.01)
(52) U.S. Cl. .................... 280/47.35; 211/134
(58) Field of Classification Search ........... 280/35, 280/47.34, 47.35, 79.11, 79.2; 108/158.12, 108/12, 26, 57.15; 248/128, 129, 298.1; 211/43, 46, 126.1, 126.15, 134, 151, 153, 211/162, 181.1
See application file for complete search history.

(56) References Cited

U.S. PATENT DOCUMENTS

| | | | | | |
|---|---|---|---|---|---|
| 3,132,609 | A | * | 5/1964 | Chesley | 108/106 |
| 4,482,066 | A | * | 11/1984 | Dykstra | 211/151 |
| 4,595,107 | A | * | 6/1986 | Welsch | 211/187 |
| 4,616,756 | A | * | 10/1986 | Holtz | 211/132.1 |
| D301,790 | S | * | 6/1989 | Ivano | D34/21 |
| 4,930,640 | A | * | 6/1990 | Edwards | 211/134 |
| 4,986,555 | A | * | 1/1991 | Andreen | 280/47.35 |
| 4,998,023 | A | * | 3/1991 | Kitts | 280/47.35 |
| 5,390,803 | A | * | 2/1995 | McAllister | 211/153 |
| 5,415,302 | A | * | 5/1995 | Carlson et al. | 211/187 |
| 5,531,464 | A | * | 7/1996 | Maurer et al. | 280/47.35 |
| D381,168 | S | * | 7/1997 | Delmerico et al. | D34/21 |
| 5,685,442 | A | * | 11/1997 | Yoshino et al. | 211/201 |
| 5,779,070 | A | * | 7/1998 | Dickinson et al. | 211/187 |
| 5,797,503 | A | * | 8/1998 | Stevens et al. | 211/187 |
| 5,839,739 | A | * | 11/1998 | Shannon et al. | 280/47.35 |
| 5,887,878 | A | * | 3/1999 | Tisbo et al. | 280/47.19 |
| 6,015,053 | A | * | 1/2000 | Sheng | 211/188 |
| 6,079,575 | A | * | 6/2000 | Wang | 211/187 |
| 6,079,719 | A | * | 6/2000 | Tisbo et al. | 280/47.35 |
| 6,135,299 | A | * | 10/2000 | Burgess | 211/194 |
| 6,364,139 | B1 | * | 4/2002 | Chen | 211/187 |
| 6,402,167 | B1 | * | 6/2002 | Calleja | 280/79.3 |
| 6,491,173 | B1 | * | 12/2002 | Costa | 211/126.15 |
| 6,578,720 | B1 | * | 6/2003 | Wang | 211/126.15 |

(Continued)

FOREIGN PATENT DOCUMENTS

CN 2810099 Y 8/2006

*Primary Examiner*—J. Allen Shriver, II
*Assistant Examiner*—Jacob Meyer
(74) *Attorney, Agent, or Firm*—Frank R. Niranjan

(57) ABSTRACT

A service cart (100) includes a supporting frame (10) and a fixing shelf (20) secured to the supporting frame and a movable shelf (30). The movable shelf is movably secured to the supporting frame and located below the fixing shelf. The movable shelf can move horizontally relative to the supporting frame to extend out of the supporting frame a distance from any of two opposite lateral sides of the service cart.

14 Claims, 6 Drawing Sheets

U.S. PATENT DOCUMENTS

| | | | |
|---|---|---|---|
| 6,634,668 B2 * | 10/2003 | Urffer et al. | 280/651 |
| 6,695,156 B1 * | 2/2004 | Wang | 211/187 |
| 6,726,040 B1 * | 4/2004 | Chen | 211/187 |
| 6,796,565 B2 * | 9/2004 | Choi et al. | 280/47.35 |
| D584,906 S * | 1/2009 | Vanderheyden et al. | D6/462 |
| 7,540,510 B2 * | 6/2009 | Sparkowski | 280/79.3 |
| 7,628,410 B2 * | 12/2009 | Fitzgerald et al. | 280/47.35 |
| 2004/0065633 A1 * | 4/2004 | Chen | 211/187 |
| 2006/0232032 A1 * | 10/2006 | Goldberg | 280/47.35 |
| 2008/0073303 A1 * | 3/2008 | Li | 211/153 |
| 2008/0143069 A1 * | 6/2008 | Richards et al. | 280/47.35 |
| 2008/0272565 A1 * | 11/2008 | Fitzgerald et al. | 280/47.35 |
| 2008/0308516 A1 * | 12/2008 | Li | 211/153 |
| 2010/0089852 A1 * | 4/2010 | Wang | 211/153 |

* cited by examiner

SERVICE CART

BACKGROUND

1. Technical Field

The present invention relates generally to a service cart, and particularly to a service cart with horizontal storage sections which can be drawn out of the cart a distance from both two opposite sides of the cart.

2. Description of Related Art

Service carts are widely used to transport materials in plants, storehouses and supermarkets by hand. The service cart generally has a supporting frame and at least one fixing shelf horizontally secured to the supporting frame. Furthermore, for carrying more materials, some conventional service carts are constructed to have a plurality of fixing shelves parallel to each other along a vertical direction. However, it is difficult for user to access the materials put on the fixing shelf at a middle position or a bottom position of the supporting frame due to obstruction of the fixing shelf at a top position, especially, when the materials are positioned near a center of the lower fixing shelf.

What is needed, therefore, is a service cart, which can overcome the above-mentioned disadvantage.

SUMMARY

A service cart includes a supporting frame and a fixing shelf secured to a top of the supporting frame and a movable shelf. The movable shelf is movably secured to the supporting frame and located below the fixing shelf. The movable shelf can be pulled horizontally relative to the supporting frame to extend a distance out of the supporting frame. The movable shelf can be drawn out along any of two opposite side directions of the service cart.

Other advantages and novel features of the present invention will become more apparent from the following detailed description when taken in conjunction with the accompanying drawings.

BRIEF DESCRIPTION OF THE DRAWINGS

Many aspects of the present service cart can be better understood with reference to the following drawings. The components in the drawings are not necessarily drawn to scale, the emphasis instead being placed upon clearly illustrating the principles of the present service cart. Moreover, in the drawings, like reference numerals designate corresponding parts throughout the several views.

DETAILED DESCRIPTION

Figure 1:
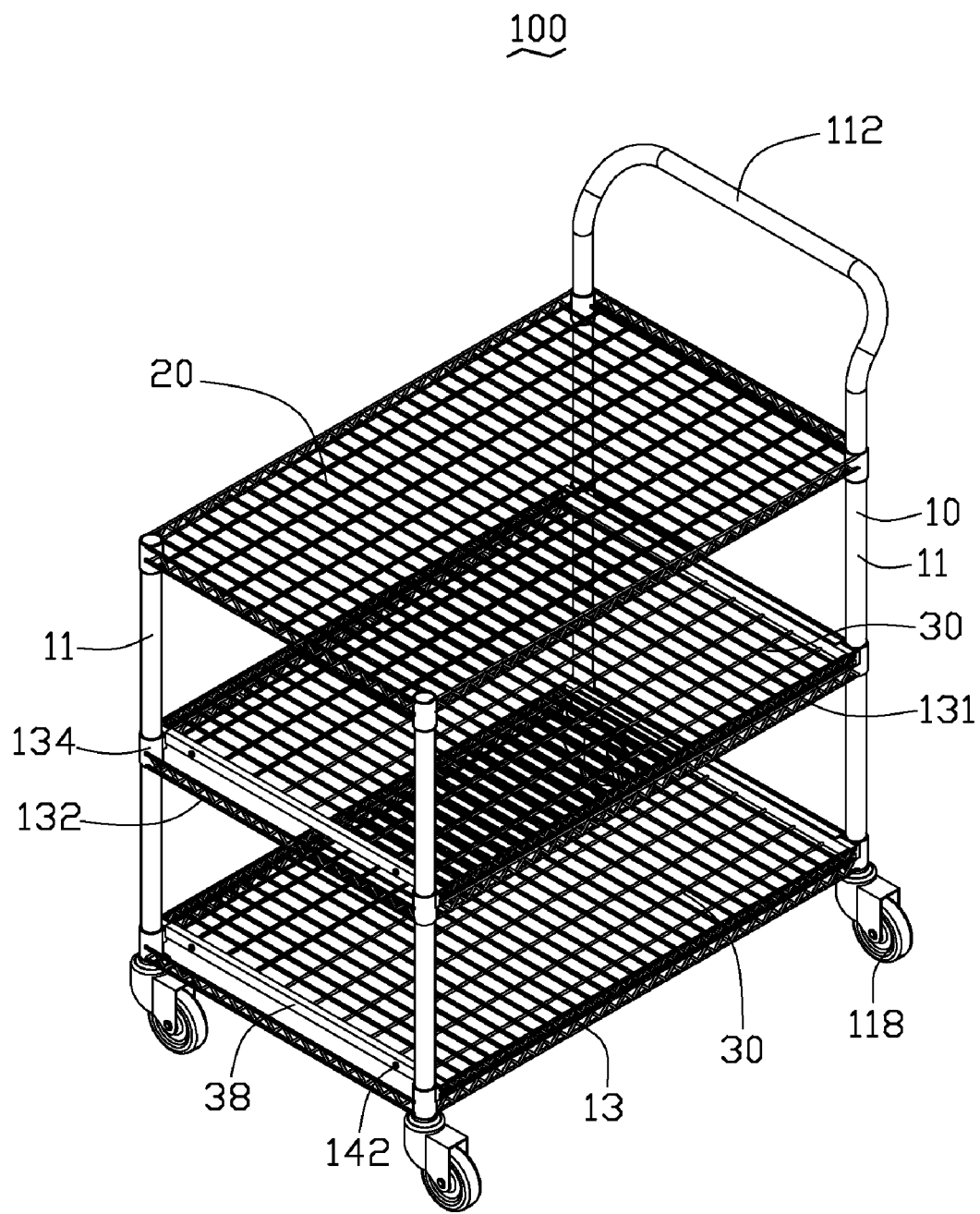
FIG. 1 is an isometric view of a service cart in accordance with a first preferred embodiment of the present invention, showing movable shelves in fully inserted position.
Figure 2:
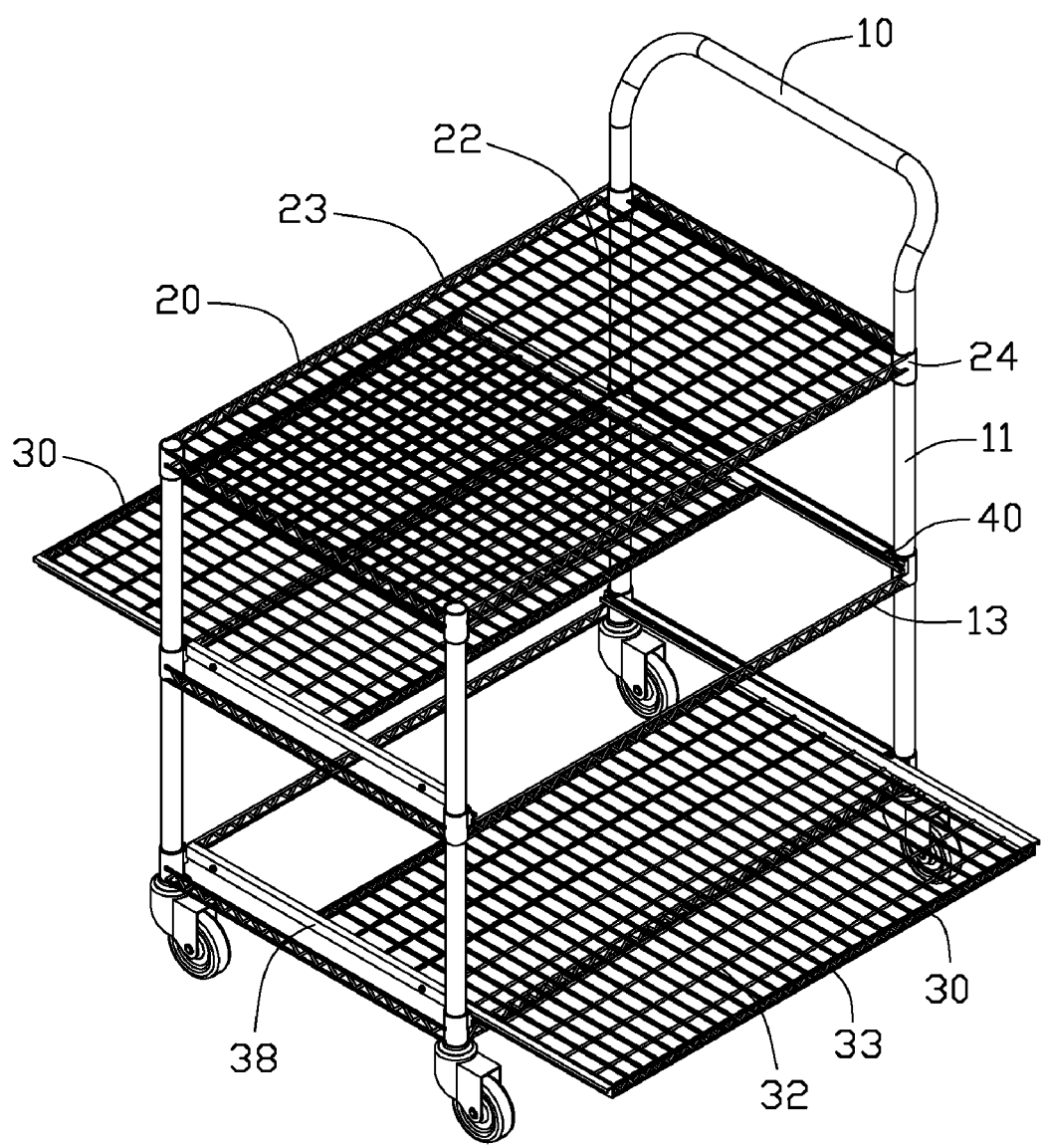
FIG. 2 is an isometric view of the service cart shown in FIG. 1, showing the movable shelves in fully extended position.

Referring to FIGS. 1 and 2, a service cart 100 in accordance with a preferred embodiment of the present invention is shown. The service cart 100 can be used to carry materials in plants, storehouses and supermarkets. The service cart 100 comprises a supporting frame 10, a fixing shelf 20 and two movable shelves 30. The fixing shelf 20 is secured to a top portion of the supporting frame 10. The two movable shelves 30 are respectively, movably secured to a middle portion and a bottom portion of the supporting frame 10. The shelves 20, 30 are parallel to each other along a vertical direction. The movable shelves 30 can slide in or out of the supporting frame 10 along a horizontal direction from any of two opposite lateral sides of the service cart 100.

The frame 10 includes four vertical posts 11 spaced from each other and two rectangular connecting racks 13. The connecting racks 13 are used to connect the posts 11 together. A U-shaped handle 112 is formed on a side of a top of the frame 10 by integrally, upwardly extending ends of two posts 11 at the corresponding side. The handle 112 is used to push or pull the service cart 100. Each of the posts 11 has a wheel 118 pivotally secured to a bottom thereof. Each wheel 118 can rotate within 360° around the corresponding post 11. A brake (not shown) is assembled on two of the wheels 118 at a same side as the handle 112.

The connecting racks 13 are respectively assembled to a middle portion and a bottom portion of the posts 11. Each connecting rack 13 has two opposite long steel bars 131, two opposite short steel bars 132 and four steel loops 134 at four corners respectively. The steel bars 131, 132 connected by the steel loops 134 cooperatively enclose a rectangular configuration. The steel bars 131, 132 are made by a plurality of steel wires. The steel bars 131 are longer than the steel bars 132. Two adjacent steel bars 131, 132 are soldered to an outer surface of each steel loop 134. Each steel loop 134 has a vertical, through hole (not labeled) with a diameter which is approximately equal to an outer diameter of the post 11. In assembly, the posts 11 are inserted into the through holes of the steel loops 134 of the connecting racks 13 and secured to the steel loops 134 at required positions by a known joining method, such as spot welding, so as to connect the posts 11 and the connecting racks 13 together.

Figure 3:
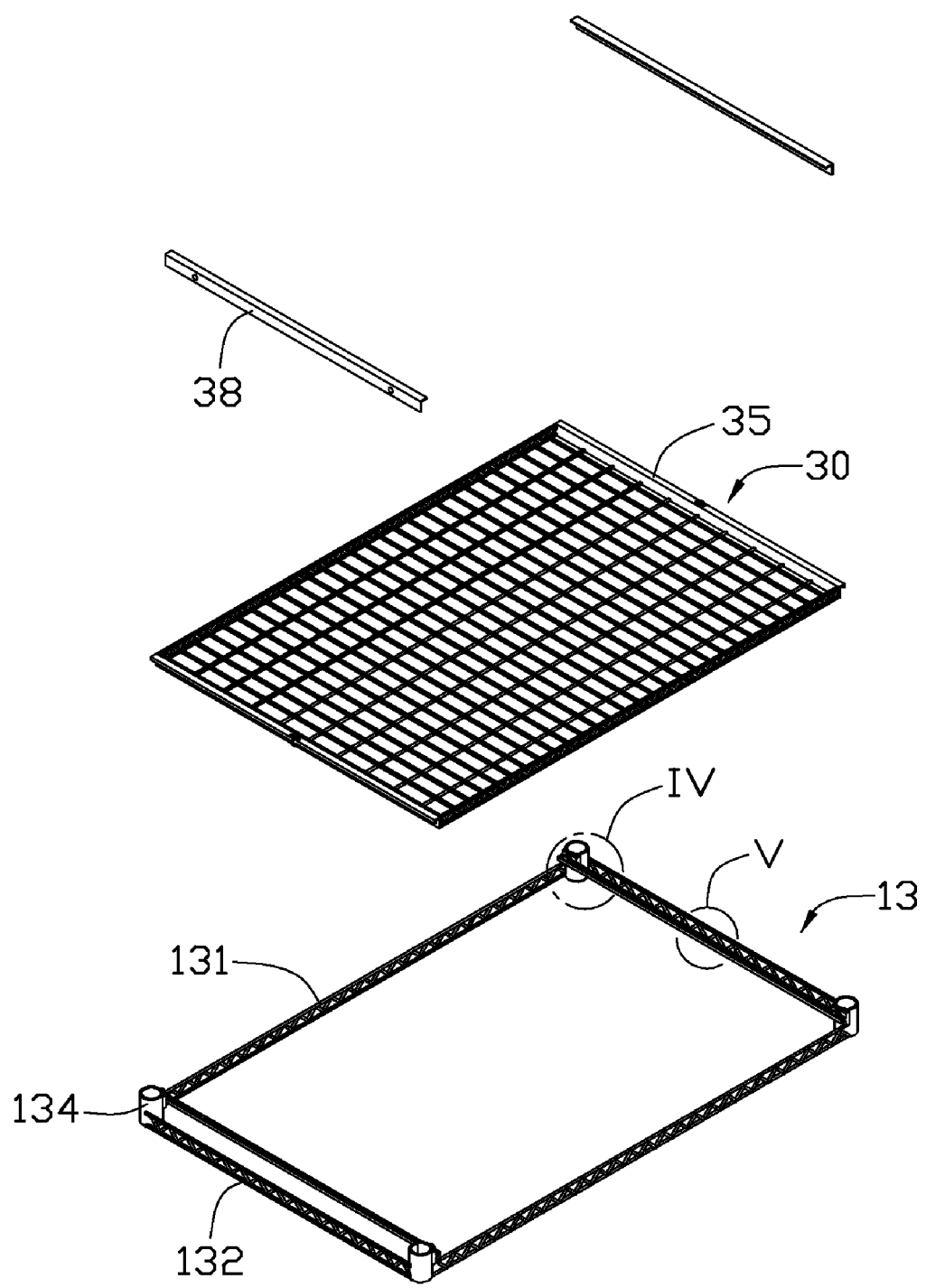
FIG. 3 is an explored, isometric of a connecting rack, one of the movable shelves and angle irons shown in FIG. 1.
Figure 4:
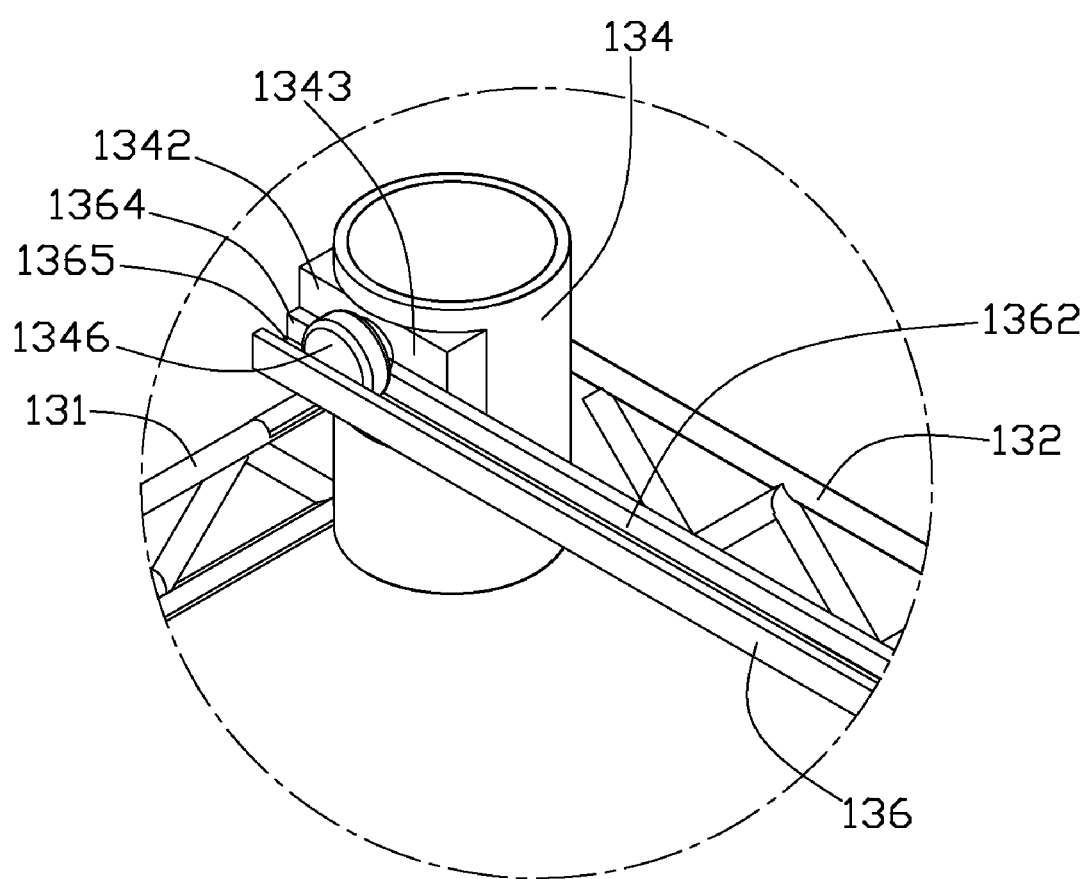
FIG. 4 is an enlarged, isometric view of a circle IV of FIG. 3.
Figure 5:
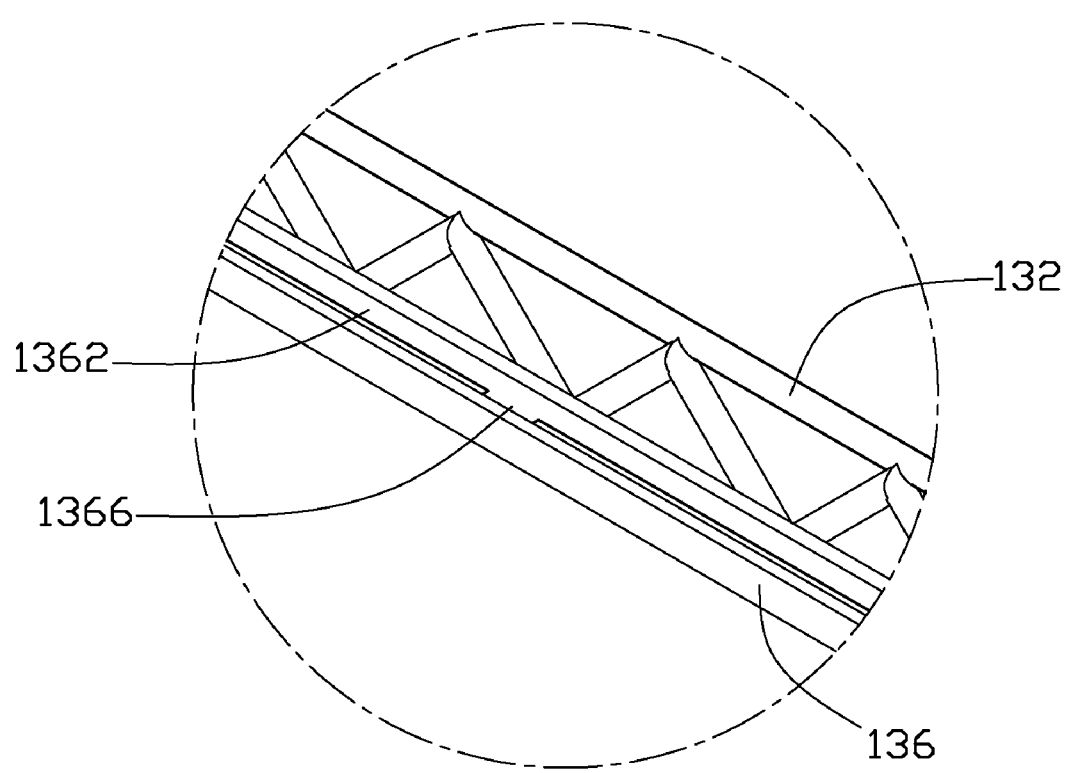
FIG. 5 is an enlarged, isometric view of a circle V of FIG. 3.

Referring to FIG. 3 to FIG. 5, each of the connecting racks 13 further includes two first slideways 136 at same sides as the short steel bars 132 respectively. The first slideway 136 is a metal bracket having an approximately U-shaped cross section. Each first slideway 136 has two vertical sides 1364 and a horizontal side 1365 with smooth surfaces. The sides 1364, 1365 cooperatively enclose a horizontal groove 1362 opening upwardly and laterally. Each of the steel loops 134 has a rectangular protrusion 1342 protruding from the outer surface thereof and located adjacent to the first slideway 136. The protrusion 1342 has an inner plane 1343. The vertical side 1364 of the first slideway 136 adjacent to the steel loop 134 is securely attached to the inner plane 1343 of the protrusion 1343 by welding. A pulley 1346 has a shaft (not labeled) extending horizontally from the inner plane 1343 and is partly inserted into the groove 1362. The pulley 1346 does not touch the sides 1364, 1365 so that the pulley 1346 can rotate around the shaft (not labeled) freely. An arched hole 1366 is defined in mid-way of the horizontal side 1365.

Each connecting rack 13 further comprises two L-shaped angle irons 38 fixing to the first slideways 136 respectively, so as to form two guideways 40. Each angle iron 38 is fixed to an outer one of the vertical sides 1364 via two screws 142. When assembled, a wall (not labeled) of the angle iron 38 is secured to the outer vertical side 1364 and the other wall thereof is extended over the horizontal groove 1362. Thus, a recess (not labeled) defined by the angle iron 38 is communicated with and located above the groove 1362 of the first slideway 136. Thus, the guideway 40 is enclosed by the first slideway 136 and the angle iron 38. The pulley 1346 is received in the guideway 40 and also can rotate freely in the guideway 40.

The fixing shelf 20 has a generally rectangular holding portion 22 and four edge portions 23 cooperatively enclosing the holding portion 22. The holding portion 22 has a net shape woven by a plurality of steel wires intersecting in rows and columns. The edge portions 23 are similar to the steel bars 131, 132 of the connecting rack 13. The edge portions 23 are vertically higher than the holding portion 22 for blocking materials from rolling or sliding out the holding portion 22. The holding portion 22 is integrally connected with the edge portions 23 by welding. The fixing shelf 20 further includes four steel loops 24 similar to the steel loops 134. The fixing shelf 20 is secured to the supporting frame 10 via the steel loops 24 secured to top ends of the posts 11.

Figure 6:
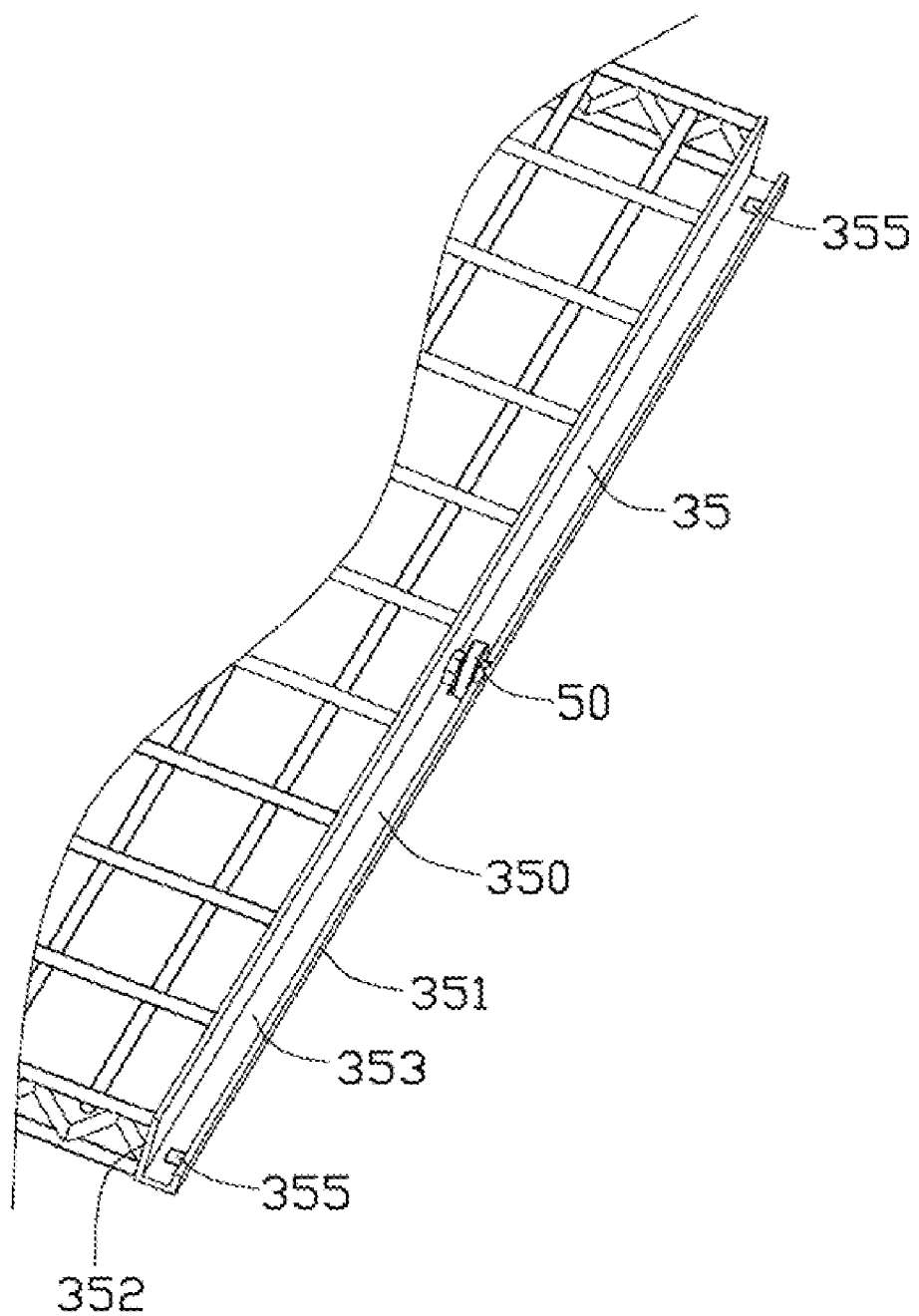
FIG. 6 is an enlarged, isometric view of a lateral side of the movable shelf shown in FIG. 3, but shown from an opposite bottom aspect.

Also referring to FIG. 6, the movable shelves 30 each have a similar configuration to the fixing shelf 20. The movable shelf 30 has a holding portion 32 and two opposite edge portions 33 respectively similar to the holding portion 22 and the edge portions 23. The movable shelves 30 are used to slideably engage with the connecting racks 13. The difference between the movable shelf 30 and the fixing shelf 20 is that two opposite sides of the movable shelf 30 at same sides as the guideways 40 respectively are constructed with two second slideways 35. The second slideways 35 are each formed by bending a metal bracket into an approximate L shape. Each second slideway 35 includes two vertical sides 351, 352 and a horizontal side 353 connecting the sides 351, 352. The side 352 connecting the holding portion 32 is much higher than the side 351. The sides 351, 352, 353 cooperatively enclose a groove 350 extending along the horizontal direction. A pulley 50 is pivotally secured to a midway of the second slideway 35. The pulley 50 can rotate freely in the groove 350. The pulley 50 can partly fit into the arched hole 1366 of the first slideway 136. Two arched holes 355 are defined in two ends of the horizontal side 353. The two arched holes 355 each have a contour corresponding to a part of the pulley 1346. The second slideway 35 can fit into the guideway 40. The vertical sides 352 is attached to a side of the holding portion 32 by welding.

In assembly, when the movable shelves 30 are in the fully inserted position: the grooves 350 of the second slideways 35 face downward to the grooves 1362 of the first slideways 136 respectively, the pulleys 50 of the second slideways 35 each abut against the horizontal side 1365 of a corresponding one of the first slideways 136, and two ends of each second slideway 35 abut against the pulleys 1346 of the connecting rack 13, respectively. The other walls of the angle irons 38 each are located over a corresponding one of the second slideways 35 for preventing the second slideways 35 from rising to disengage from the first sideways 136 when the movable shelves 30 is pulled to slide out. The pulleys 50 of the movable shelves 30 partly fit into the arched holes 1366, meanwhile, the arched holes 355 partly receive the pulleys 1346 of the connecting racks 13, so as to limit the extent that the movable shelf 30 moves along the horizontal direction.

When the movable shelves 30 are required to move from the inserted position: pull the long edge portion 33 so as to slip the pulleys 50 out of the arched holes 1366, meanwhile, the arched holes 355 depart from the pulleys 1346; then, the second slideways 35 supported by the pulleys 1346 slide out gradually so that the movable shelves 30 can be moved. The movable shelves 30 can slide along either of the horizontal directions, till the pulleys 50 abut against the pulleys 1346 so that substantially a half of the movable shelves 30 can extend out of the supporting frame 10. When loading or unloading materials, the user can firstly pull out of the movable shelves 30, then handle the materials conveniently. Thus, the movable shelf 30 allows for easy access of the materials.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A service cart comprising:
    a supporting frame;
    a fixing shelf secured to the supporting frame;
    two guideways respectively fixed at two opposite sides of the supporting frame, wherein each of the guideways is enclosed by an elongated first slideway and an elongated angle iron, the first slideway has a U-shaped cross section and an open side oriented toward the fixing shelf, and the angle iron has an L-shaped cross section with an open side oriented away from the fixing shelf and is coupled to the open side of the first slideway; and
    a movable shelf movably mounted to the supporting frame and located below the fixing shelf, wherein the movable shelf comprises two second slideways respectively formed at two opposite sides thereof, and the two second slideways are respectively movably engaged in the two guideways and can move horizontally along the guideways to extend out of the supporting frame along any of two opposite directions of the service cart.

2. The service cart as claimed in claim 1, wherein each of the guideways comprises two pulleys pivotally secured at two ends of the first slideway thereof, respectively, each second slideway comprises a pulley pivotally secured in a midway thereof, and the pulley of the each second slideway is located between and moveable between the pulleys of the first slideway of a corresponding guideway.

3. The service cart as claimed in claim 2, wherein each second slideway defines two holes corresponding to the pulleys of the first slideway of the corresponding guideway for partly receiving the pulleys of the first slideway, and the first slideway of each of the guideways defines a hole in a midway corresponding to the pulley of a corresponding second slideway for partly receiving the pulley of the corresponding second slideway therein.

4. The service cart as claimed in claim 1 further comprising a second movable shelf, wherein the fixing shelf, the movable shelve, and the second movable shelve are secured to the supporting frame in order along a vertical direction from a top to a bottom.

5. The service cart as claimed in claim 1, wherein the supporting frame comprises four vertical posts and at least one connecting rack connecting the posts together.

6. The service cart as claimed in claim 5, wherein the at least one connecting rack has a rectangular configuration and comprises four steel bars and four steel loops at four corners respectively, and the steel bars connected by the steel loops cooperatively define the rectangular configuration.

7. A service cart comprising:
    a supporting frame having four posts spaced from each other and at least one connecting rack connecting the posts together;

a fixing shelf secured to a top portion of the supporting frame and over the at least one connecting rack;

two first slideways respectively fixed at two opposite sides of the at least one connecting rack, each of the first slideways comprising an elongated horizontal side, and inner and outer vertical sides respectively extending up from inner and outer lateral edges of the horizontal side towards the fixing shelf, the inner and outer vertical sides cooperatively enclosing a groove opening upwardly;

at least one movable shelf movably secured to the at least one connecting rack of the supporting frame, the at least one movable shelf comprising two second slideways respectively formed at two opposite sides thereof and movably engaged in the grooves of the first slideways, wherein the at least one movable shelf can move horizontally relative to the at least one connecting rack of the supporting frame to move out of the supporting frame a distance along any of two opposite side directions of the service cart.

8. The service cart as claimed in claim 7, wherein the at least one connecting rack has a rectangular configuration and comprises four steel bars and four steel loops at four corners respectively, and the steel bars connected by the steel loops cooperatively define the rectangular configuration.

9. The service cart as claimed in claim 8, wherein the steel loops each define a through hole for a corresponding one of the posts to extend therethrough.

10. The service cart as claimed in claim 8, wherein two ends of the outer vertical side of each first slideway are respectively secured to outer surfaces of two steel loops.

11. The service cart as claimed in claim 10, further comprising an L-shaped angle iron, coupled to each first slideway to form a guideway, the angle iron comprising a first elongated wall secured to the outer vertical side of the first slideway and a second elongated wall over the groove.

12. The service cart as claimed in claim 11, wherein each of the guideways further comprises two pulleys pivotally securing the two ends of the outer vertical side of the first slideway to the outer surfaces of the two steel loops, respectively, and the second slideway comprises a pulley pivotally secured in a midway thereof.

13. The service cart as claimed in claim 12, wherein the second slideway defines two holes corresponding to the pulleys of each of the guideways for partly receiving the pulleys of a corresponding guideway, and each of the guideways defines a hole in a midway corresponding to the pulley of the second slideway for partly receiving the pulley of the second slideway.

14. The service cart as claimed in claim 8 further comprising a second connecting rack and a second movable shelf movably secured to the second connecting rack, wherein the fixing shelf and the two movable shelves are secured to the supporting frame in order along a vertical direction from a top to a bottom.

* * * * *